Figure 1:
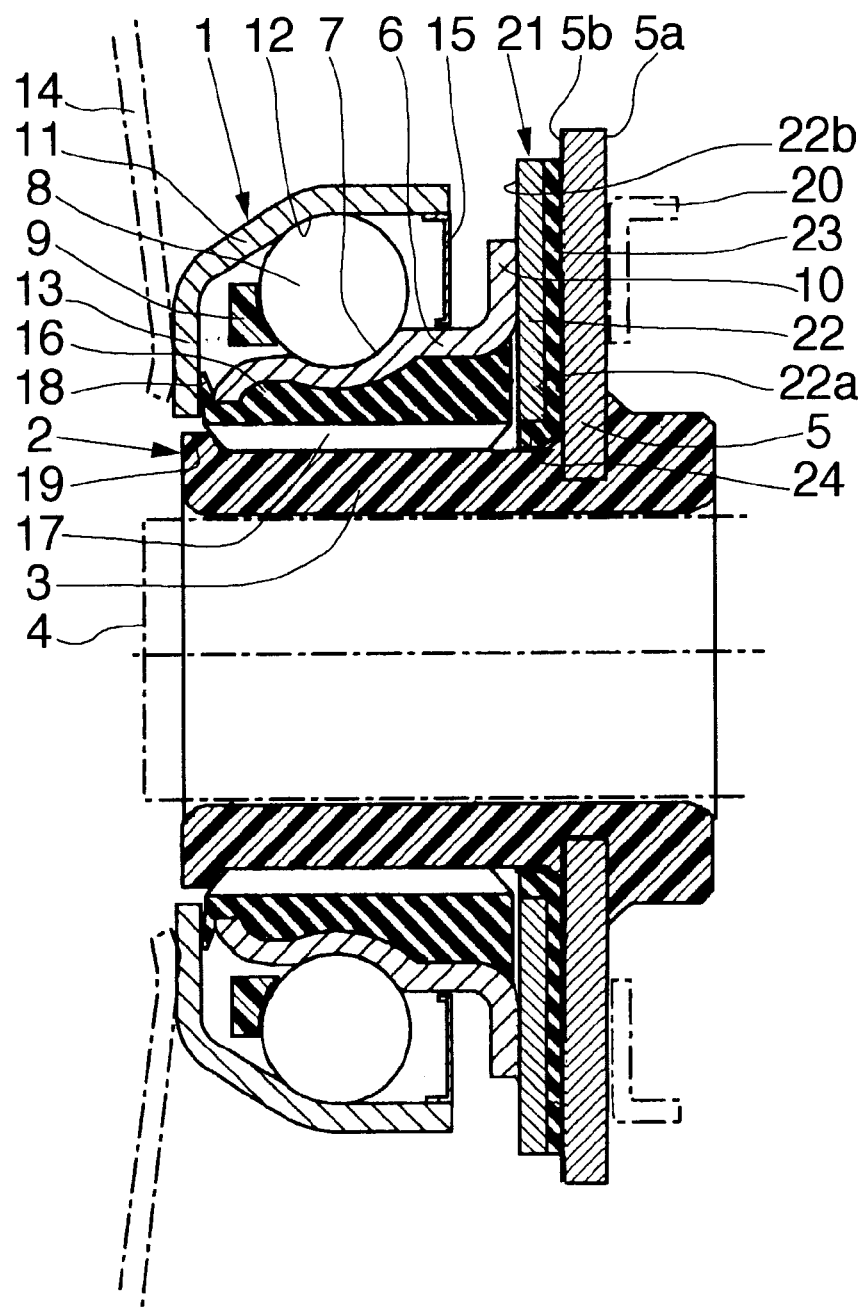

United States Patent

Ponson et al.

[11] Patent Number: 6,126,324
[45] Date of Patent: Oct. 3, 2000

[54] CLUTCH-RELEASE BEARING WITH VIBRATION DAMPER

[75] Inventors: Frédéric Ponson, Luynes, France; Michael Carter, Letchworth, United Kingdom

[73] Assignee: SKF France, France

[21] Appl. No.: 09/288,074

[22] Filed: Apr. 8, 1999

[30] Foreign Application Priority Data

Apr. 29, 1998 [FR] France .................................. 98 05404

[51] Int. Cl.$^7$ .............................. F16C 19/00; F16D 23/14
[52] U.S. Cl. ........................ 384/612; 192/98; 192/110 B
[58] Field of Search .................... 384/612, 617; 192/98, 110 B

[56] References Cited

U.S. PATENT DOCUMENTS

| | | | |
|---|---|---|---|
| 3,604,545 | 9/1971 | Bourgeols . | |
| 3,882,979 | 5/1975 | Limbacher et al. | 192/98 |
| 3,904,008 | 9/1975 | Soonerat | 192/98 |
| 3,921,775 | 11/1975 | Matyschik | 192/110 B X |
| 4,228,881 | 10/1980 | Nakamura | 192/98 |
| 4,566,578 | 1/1986 | Leigh-Monstevens et al. | 384/617 X |
| 4,951,796 | 8/1990 | Harrington et al. | 192/98 |
| 5,156,248 | 10/1992 | Caron | 384/612 X |
| 5,630,575 | 5/1997 | Koyanagi | 267/140.3 |

FOREIGN PATENT DOCUMENTS

| | | |
|---|---|---|
| 0164947A | 12/1985 | European Pat. Off. . |
| 1589720A | 4/1970 | France . |
| 2230235A | 12/1974 | France . |
| 2364364A | 4/1978 | France . |
| 2614662A | 11/1988 | France . |
| 2006377A | 5/1979 | United Kingdom . |

*Primary Examiner*—Thomas R. Hannon
*Attorney, Agent, or Firm*—Smith, Gambrell & Russell, LLP

[57] ABSTRACT

Clutch-release bearing device of the type comprising a rolling-contact bearing 1 with a rotating race 11 and a non-rotating race 6 and mounted on a rigid operating element 2 equipped with a tubular part 3 and a radial flange 5 against which a radial portion 10 of the non-rotating race 6 bears, and with self-alignment between the non-rotating race and the operating element. The device comprises at least one damping member 21 placed between the radial portion 10 of the non-rotating race 6 and the radial flange 5 of the operating element 2, the damping member comprising at least one thin metal element 22 which has two opposed parallel radial faces, and an elastic coating 23 covering at least one of the faces and secured to the metal element 22.

19 Claims, 3 Drawing Sheets

CLUTCH-RELEASE BEARING WITH VIBRATION DAMPER

The present invention is in the field of clutch-release bearings.

A clutch-release bearing generally comprises:

a rolling-contact bearing made up of a rotating race and of a non-rotating race between which there are arranged balls which are uniformly distributed in the circumferential direction by means of a cage; the rotating race has an active surface intended to come into contact with the ends of the fingers that make up a clutch diaphragm;

an operating element supporting the rolling-contact bearing and which, under the action of a mechanical, electrical or hydraulic control member, shifts the thrust rolling bearing axially against the clutch diaphragm; the operating element generally comprises an axial portion of tubular shape and a radial portion against which the non-rotating race of the thrust rolling bearing bears;

self-alignment means inserted between the non-rotating race of the thrust rolling bearing and the operating member, the said means generally providing a connection between rolling bearing and operating element while at the same time allowing the rolling bearing a certain amount of axial travel relative to the operating element, which allows the bearing to self-align with the clutch diaphragm when the axes of rotation of these two elements are not perfectly aligned at the outset.

When control of the thrust bearing is mechanical, it is generally achieved by means of a metal control fork, the two fingers of which bear against a treated metal bearing surface of the operating element, the said operating element being made of plastic or light alloy. The fork is actuated by the clutch pedal via a linkage.

Control may also be achieved hydraulically, by means of a push rod actuating the operating element, the push rod being itself actuated by the clutch pedal and a piston.

Some of the vibration and noise generated mainly by the engine and by the gearbox, is transmitted to the cabin of the vehicle via the clutch diaphragm, the thrust bearing and the thrust bearing control system.

A device capable of filtering out the vibration between the thrust bearing and the control fork in the clutch-engaged position has already been proposed (FR 8219713). However, this device is inoperative in the clutch-released position, because the metal bearing plate comes into direct contact with the radial flange of the operating element and allows the vibration to be transmitted. What is more, this device is not suited to cases in which the radial flange of the guidance sleeve is made of metal.

Document FR 2230235 proposes a thrust bearing with noise damping using a rubber sleeve sliding directly on the guide tube. A layer of rubber is arranged axially between the stationary race and the fork bearing plate. This solution is specific to this type of thrust bearing only, in which self-centring can be achieved through elasticity between the rubber sleeve and guide tube and is unsuitable for thrust bearings with rigid operating elements and self-centring sleeves inserted between the rolling bearing and the operating element and in which the sleeve has to be able to move radially with respect to the radial portion of the operating element.

The object of the present invention is to overcome these problems by proposing a thrust bearing device with vibration damping capable of permanently filtering out the said vibration and suitable for various types of thrust bearing with or without metal flanges and for various types of operating element.

The clutch-release thrust bearing device according to the invention is of the type comprising a rolling-contact bearing with a rotating race and a non-rotating race and mounted on a rigid operating element equipped with a tubular part and a radial flange against which a radial portion of the non-rotating race bears. Means of self-alignment are provided between the non-rotating race and the operating element. The thrust-bearing device comprises at least one damping member placed between the radial portion of the non-rotating race and the radial flange of the operating element. The damping member comprises at least one thin metal element which has two opposed parallel radial faces, and an elastic coating covering at least one of the said faces and secured to the metal element. In a volume which still remains small, this thrust bearing stops vibration from the engine and gearbox from being transmitted back towards the cabin of the vehicle, and thus increases the level of comfort in using and driving the vehicle.

In one embodiment of the invention, the damping member comprises a metal element and an elastic coating made on one radial face of the metal element.

In another embodiment of the invention, the damping member comprises a metal element, each radial face of which is covered with an elastic coating.

In another embodiment of the invention, the damping member comprises two metal elements, each equipped on one of their radial faces with an elastic coating that is common to both metal elements, the elastic coating being sandwiched between the two metal elements.

Advantageously, the elastic coating covers the interior edge of the metal element. The elastic coating may also cover the exterior edge of the metal element.

In one embodiment of the invention, the metal element is in contact with the non-rotating race and the elastic coating is in contact with the radial flange.

In another embodiment of the invention, the metal element is in contact with the radial flange and the elastic coating is in contact with the non-rotating race.

The damping coating may consist of an elastomer or equivalent flexible material. In addition to permanently damping out the noise and vibration independently of the position of the clutch, the thrust bearing in accordance with the invention is of lower cost. Its parts are easy to handle and to fit because the metal element gives the damping member a certain degree of rigidity. It is easy to adapt to existing thrust bearings without modifying the rolling bearing or, in most cases, the operating element.

Figure 2:
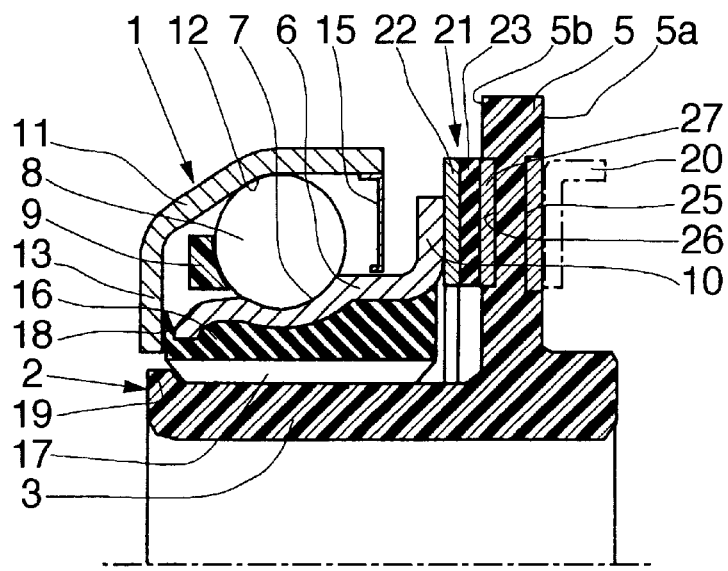
Figure 3:
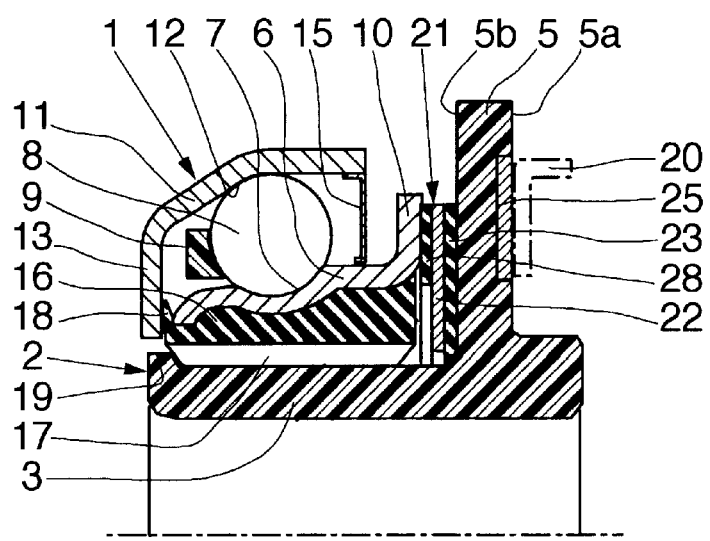
Figure 4:
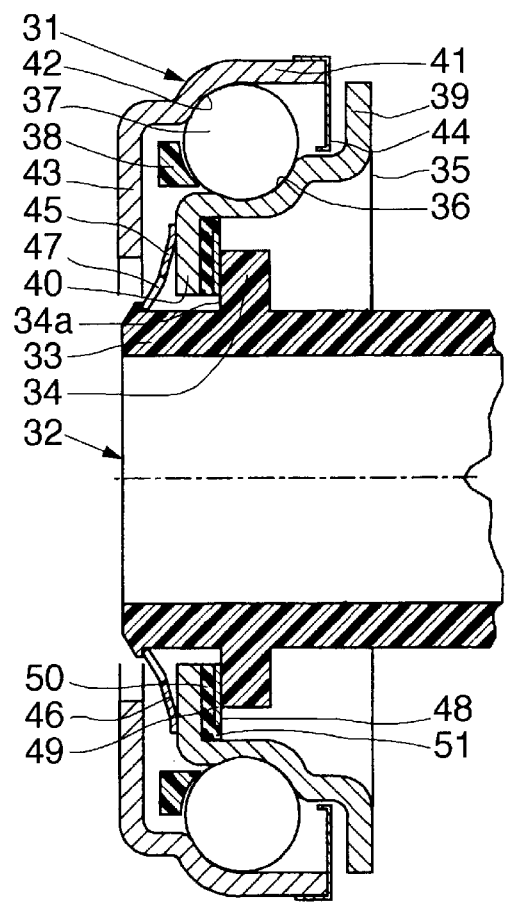
Figure 5:
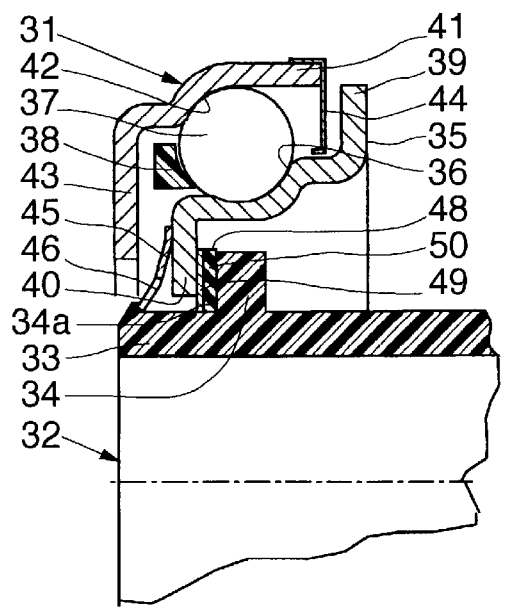

The present invention will be better understood and other advantages will emerge from reading the detailed description of a number of embodiments taken by way of non-limiting examples and illustrated in the appended drawings, among which:

FIGS. 1 to 3 are views of axial section of a clutch-release thrust bearing device according to four alternative forms of a first embodiment of the invention; and FIGS. 4 and 5 are views in axial section of a clutch-release thrust bearing device according to two alternative forms of a second embodiment of the invention.

As can be seen in FIGS. 1 to 3, the clutch-release thrust bearing in accordance with the invention comprises a rolling-contact bearing 1 mounted on an operating element 2, which comprises a tubular portion 3 which can slide with respect to a guide tube 4, and a radial flange 5.

The rolling-contact bearing 1 comprises a thin-walled non-rotating inner race 6 produced by pressing a sheet or a tube and having a torus-shaped raceway 7 for a row of balls 8 held in place by a cage 9. The non-rotating inner race 6 also comprises an outwardly-facing annular extension in the form of a radial flange 10.

The rolling-contact bearing 1 is completed by a rotating outer race 11, also with thin walls, produced by pressing a sheet or a tube, and which has a torus-shaped raceway 12 for the balls 8, and a radial portion 13 which can come into contact with the surface of the diaphragm 14 of a clutch device when the entire thrust bearing is shifted axially with respect to the guide tube 4 on which the operating element 2 slides. The rolling-contact bearing 1 is protected by a protective end plate 15 fixed to the outer race 11.

A sleeve 16 of elastic material, for example of elastomer or natural rubber, is placed inside the inner race 6 and has a number of ribs 17 parallel to the axis of the thrust bearing, facing inwards, and the internal free edge of which comes into contact with the exterior surface of the cylindrical portion 3 of the operating element 2. The elastic sleeve 16 has an annular lip 18 which seals the rolling-contact bearing 1 by coming into contact with the outer race 11. An annular rib 19, moulded integrally with the operating element 2, is arranged at the end of the cylindrical portion 3 and holds the bearing 1 in place on the operating element 2 prior to fitting on the guide tube 4.

As can be seen more specifically in FIG. 1, the radial flange 5 of the operating element 2 consists of a metal plate in the shape of a disc over which the rigid synthetic material containing inorganic fillers or the like that forms the cylindrical portion 3 of the operating element 2 is moulded. This metal plate made of steel has preferably undergone a surface-hardening heat treatment and comprises a radial surface 5a away from the bearing 1 with which a control member 20, depicted in chain line, comes into contact, and exerts a force in the axial direction to cause the thrust bearing as a whole to shift with respect to the guide tube 4 during a clutch-release operation. The radial flange 5 also comprises a radial surface 5b away from the radial surface 5a and which lies opposite the rolling-contact bearing 1.

Arranged axially between the radial surface 5b of the radial flange 5 and the radial flange 10 of the inner race 6 is a damping member 21 which comprises a flat metal plate 22 of annular shape which has a radial surface 22a on the opposite side to the rolling-contact bearing 1 and a radial surface 22b in contact with the radial flange 10 of the inner race 6, and an elastic coating 23 arranged between the radial face 22a of the metal element 22 and the radial face 5b of the radial flange 5 and secured to the metal element 22. The elastic coating 23 may be made of an elastomer or the equivalent. The elastic coating 23 extends radially inwards in the form of a rim 24 which covers the bore of the metal element 22, thus separating it from the exterior cylindrical surface of the cylindrical portion 3 of the operating element 2.

The rim 24 thus formed by the elastic coating prevents vibration from being transmitted by radial contact between the metal element 22 and the cylindrical portion 3, and allows the damping member 21 to pass over the annular rib 19 when the damping member 21 is being fitted onto the operating element 2, while at the same time preventing it from becoming detached. The rolling-contact bearing 1 can self-centre by shifting radially with respect to the operating element 2, the contact between the radial flange 10 of the inner race 6 and the metal element 22 being of the metal-to-metal type. The transmission of vibration from the engine and gearbox via the rolling-contact bearing 1 is filtered out by means of the elastic coating 23 and its rim 24.

As can be seen in FIG. 2, the operating element 2 is made entirely of synthetic substance, including the radial flange 5. The radial face 5a of the radial flange 5 has a metal wear plate 25 protecting the synthetic material from contact with the control member 20. The radial face 5b of the radial flange 5 has an annular groove 26 centred on the axis of the thrust bearing and of shallow depth. The damping member 21 here comprises a first metal element 22 in the shape of a flat washer, an elastic coating 23 and a second metal element 27 identical to the first element, arranged axially between the elastic coating 23 and the radial flange 5 and radially in the groove 26. The elastic coating 23 is sandwiched between two metal elements 22 and 27 and is bonded to these two elements 22 and 27. Here too, when the rolling bearing is self-centring, the radial movement of the rolling-contact bearing 1 with respect to the operating element 2 takes place by virtue of the contact between the radial flange 10 of the inner race 6 and the first metal element 22. The damping member 21 is held radially with respect to the operating element 2 by virtue of the annular groove 26 and does not need to extend as far as contact with the exterior cylindrical surface of the cylindrical portion 3 of the operating element 2, nor does it therefore need a rim formed by the elastic coating, hence saving weight and economizing on material.

In the embodiment illustrated in FIG. 3, the radial flange 5 is similar to the one illustrated in FIG. 2, but has no groove, its radial face 5b being flat. The damping member 21 comprises a single metal element 22 in the form of a flat washer, the radial face 22a of which is in contact with the elastic coating 23, itself in contact with the radial face 5b. The radial face 22b of the metal element 22 is in contact with an additional elastic coating 28, itself in contact with the radial flange 10 of the inner race 9. The metal element 22 is thus sandwiched between the elastic coatings 23 and 28 which are secured to it. The bore of the metal element 22 is larger than the outside diameter of the cylindrical portion 3 of the operating element 2 so that the damping member 21 can move radially during the self-alignment of the thrust bearing while at the same time remaining in contact with the radial face 5b of the radial flange 5 of the operating element 2. The damping member 21 thus has a certain amount of radial play both with respect to the rolling-contact bearing 1 and with respect to the operating element 2, and can adopt a radial position part way between these two items.

In the embodiments of FIGS. 4 and 5, the clutch bearing in accordance with the invention comprises a rolling-contact bearing 31 mounted on an operating member 32, advantageously made of synthetic material and which comprises a cylindrical portion 33 and a radial flange 34 of a small size. The rolling-contact bearing 31 comprises a non-rotating inner race 35 which has a torus-shaped raceway 36 for a row of balls 37 which are held in place in a cage 38. The inner race 35 also comprises an outwardly facing projection in the form of a radial portion 39 and an inwardly facing extension in the form of a radial portion 40 designed to exert pressure on the front surface 34a of the radial flange 34.

The rolling-contact bearing 31 is completed by a rotating outer race 41 which has a torus-shaped raceway 42 for the balls 37 and a radial portion 43 capable of coming into contact with the surface of a clutch diaphragm, not depicted. The rolling-contact bearing 31 is protected on the same side as the radial portion 39 by a protective end plate 44 fixed to the outer race 41.

The radial flange 34 is of small radial dimension so that it is completely surrounded radially by the inner race 35 while at the same time lying roughly in the same radial plane as the balls 37. The clutch-release thrust bearing thus obtained is axially very compact, its axial length being equal to that to the rolling-contact bearing 31.

A member for the elastic self-alignment and axial retention of the non-rotating race 35 with respect to the operating member 32, referenced 45 in its entirety, is arranged around the cylindrical portion 33 of the operating member 32 and axially between the radial portion 40 of the inner race 35 and the radial portion 43 of the outer race 41. The self-alignment member 45 is annular and comprises a frustoconical portion 46 from which a number of elastic tabs 47 arranged radially towards the inside and axially away from the radial flange 34 are cut. The elastic tabs 47 are axially flexible and bear against an annular rib 48 that originates from the operating element 32, forming a radially outwards projection and arranged at the end of the cylindrical portion 33 to form a stop for the self-alignment element 45 on the operating element 36 in the axial direction. The elastic self-alignment member 45 is slightly curved so that it has a convex surface for contact with the inner race 35 and thus prevents any excessive wear at this point of contact.

A damping member 48 is arranged axially between the radial portion 40 of the inner race 35 and the front surface 34a of the radial flange 34 and radially between the cylindrical portion 33 and a bore of the inner race 35. The damping member 48 comprises a flat annular metal element 49 in contact by one of its flat faces with the front surface 34a and covered on its opposite face with an elastic coating 50. The elastic coating 50 forms a rim 51 surrounding the periphery of the metal element 49 and preventing any metal-to-metal contact between the said metal element 49 and the inner race 35. The damping member 48 is thus secured to the inner race 35 and is centred in a bore of the said inner race 35.

The embodiment of FIG. 5 is similar to the previous one, with the exception that the damping member 48 has a metal element 49 in contact with the radial portion 40 of the inner race 35, and has an elastic coating 50 in contact with the front surface 34a of the radial flange 34. The damping member 48 is centred by its bore on the cylindrical portion 33, the radial portion 40 of the inner race 35 being in contact with, and capable of moving radially with respect to, the metal element 49.

A damping member in accordance with the invention is particularly simple to manufacture, the metal element advantageously being produced by cutting from a flat sheet. The flexible damping coating will then be bonded to one or both sides of the metal element using techniques such as moulding or spray deposition. In the case of the damping members of simple shape, in which the outline of the metal element corresponds to that of the flexible coating, it is possible to obtain the damping member by cutting it out, using a press for example, from a composite multilayer strip comprising at least one metal sheet coated on at least one of its faces with a layer of an elastic material. The damping member is in the form of a single item in the finished state. It is possible to envisage the use of several damping members distributed circumferentially between the non-rotating race of the thrust bearing and the operating element, instead of a single annular element concentric with the thrust bearing.

By virtue of the invention, it is possible to obtain, in a simple and economic way, permanent filtering-out of vibration in the clutch-released and in the clutch-engaged state, the consequence of this being an appreciable reduction in noise and vibration in the cabin of the vehicle.

What is claimed is:

1. Clutch-release bearing device of the type comprising a rolling-contact bearing (1) with a rotating race (11) and a non-rotating race (6) and mounted on a rigid operating element (2) equipped with a tubular part (3) and a radial flange (5) against which a radial portion (10) of the non-rotating race bears, and with means of self-alignment between the non-rotating race and the operating element, characterized in that it comprises at least one damping member (21) placed between the radial portion of the non-rotating race and the radial flange of the operating element, the said damping member comprising at least one thin metal element (22) which has two opposed parallel radial faces, and an elastic coating (23) covering at least one of the said faces and secured to the said metal element.

2. Device according to claim 1, characterized in that the damping member comprises a metal element and an elastic coating made on one radial face of the metal element.

3. Device according to claim 1, characterized in that the damping member comprises a metal element, each radial face of which is covered with an elastic coating (23, 28).

4. Device according to claim 1, characterized in that the damping member comprises two metal elements, each equipped on one of their radial faces with an elastic coating that is common to both metal elements, the elastic coating being sandwiched between the two metal elements.

5. Device according to claim 1, characterized in that the elastic coating covers the interior edge of the metal element.

6. Device according to claim 1, characterized in that the elastic coating covers the exterior edge of the metal element.

7. Device according to claim 1, characterized in that the metal element is in contact with the non-rotating race and the elastic coating is in contact with the radial flange.

8. Device according to claim 1, characterized in that the metal element is in contact with the radial flange and the elastic coating is in contact with the non-rotating race.

9. Device according to claim 1, characterized in that the damping is provided independently of the position of the clutch.

10. Clutch-release bearing device, comprising:

a rigid operating element equipped with a tubular part and a radial flange;

a rolling-contact bearing with a rotating race and a non-rotating race having a radial portion, said rolling-contact bearing being mounted on the rigid operating element, said rigid operating element being further equipped with means of self-alignment between the non-rotating race and the operating element, and at least one damping member placed between the radial portion of the non-rotating race and the radial flange of the operating element, the said damping member comprising at least one thin metal element which has two opposed parallel radial faces, and an elastic coating covering at least one of the said faces and secured to the said metal element.

11. Device according to claim 10, wherein said damping member comprises a metal element, and an elastic coating made on one radial face of the metal element.

12. Device according to claim 10, wherein said damping member comprises a metal element, with each radial face of said metal element being covered with an elastic coating.

13. Device according to claim 10, wherein said damping member comprises a metal elements, each equipped on one of their radial faces with an elastic coating being sandwiched between two metal elements.

14. Device according to claim 10, wherein said elastic coating covers an interior edge of the metal element.

15. Device according to claim 14, wherein said elastic coating covers an exterior edge of the metal element.

16. Device according to claim 10, wherein said elastic coating covers an exterior edge of the metal element.

17. Device according to claim 10, wherein said metal element is in contact with the non-rotating race and the elastic coating is in contact with the radial flange.

18. Device according to claim 10, wherein said metal element is in contact with the radial flange and the elastic coating is in contact with the non-rotating race.

19. Device according to claim 10, wherein said damping member is arranged such that damping is provided independently of clutch positioning.

* * * * *